United States Patent
Schulze

(10) Patent No.: US 6,608,878 B1
(45) Date of Patent: Aug. 19, 2003

(54) METHOD AND DEVICE FOR MONITORING THE POWER RISE DURING STARTUP OF A NUCLEAR REACTOR (DIVERSITARY EXCURSION MONITORING)

(75) Inventor: Joachim Schulze, Frankfurt am Main (DE)

(73) Assignee: Framatome ANP GmbH, Erlangen (DE)

( * ) Notice: Subject to any disclaimer, the term of this patent is extended or adjusted under 35 U.S.C. 154(b) by 61 days.

(21) Appl. No.: 09/702,022

(22) Filed: Oct. 30, 2000

Related U.S. Application Data

(63) Continuation of application No. PCT/EP99/02887, filed on Apr. 28, 1999.

(30) Foreign Application Priority Data

Apr. 28, 1998 (DE) .......................................... 198 19 001

(51) Int. Cl.[7] .............................................. G21C 17/00
(52) U.S. Cl. ...................... 376/214; 376/215; 376/216; 376/217; 376/259; 376/260
(58) Field of Search ................. 376/215, 216, 376/217, 238, 242, 254, 255, 245, 260, 259, 214

(56) References Cited

U.S. PATENT DOCUMENTS

| | | | |
|---|---|---|---|
| 3,979,255 A | 9/1976 | Bulgier et al. | 376/254 |
| 4,186,048 A | 1/1980 | Thomas | 376/254 |
| 4,337,118 A * | 6/1982 | Sakurai et al. | 376/210 |
| 5,174,946 A * | 12/1992 | Watford et al. | 376/216 |
| 5,528,639 A * | 6/1996 | Eckert et al. | 376/216 |
| 5,875,221 A * | 2/1999 | Kreuter et al. | 376/215 |
| 5,978,429 A * | 11/1999 | Kreuter et al. | 376/242 |
| 6,122,339 A * | 9/2000 | Kreuter et al. | 376/216 |
| 6,339,629 B1 * | 1/2002 | Takeuchi et al. | 376/254 |

FOREIGN PATENT DOCUMENTS

| | | |
|---|---|---|
| EP | 0 405 863 A2 | 1/1991 |
| EP | 0 496 551 A1 | 7/1992 |

OTHER PUBLICATIONS

Published International Application No. WO 97/23879 (Kiel et al.), dated Jul. 3, 1997.
Published International Application No. WO 96/21929 (Kreuter et al.), dated Jul. 18, 1996, as mentioned on p. 1 of the specification.
Japanese Patent Abstract No. 03115996 (Tadayoshi), dated May 16, 1991.
Japanese Patent Abstract No. 54129295 (Ritsuo), dated Oct. 6, 1979.
Derwent Abstract No. XP–002112521.

* cited by examiner

*Primary Examiner*—Michael J. Carone
*Assistant Examiner*—Jack Keith
(74) *Attorney, Agent, or Firm*—Laurence A. Greenberg; Werner H. Stemer; Gregory L. Mayback

(57) ABSTRACT

A method and a device are provided for monitoring a power rise during startup of a nuclear reactor (diversitary excursion monitoring). In order to be able to shut down the reactor during startup in the event of prompt critical states, a power band situated in a lower measuring range is prescribed for a signal of power range channels which detects the reactor power in the power range. Startup is continued only when the signal does not exceed an upper limit within a minimum time, after the last occasion of exceeding a lower limit of the power band.

24 Claims, 6 Drawing Sheets

METHOD AND DEVICE FOR MONITORING THE POWER RISE DURING STARTUP OF A NUCLEAR REACTOR (DIVERSITARY EXCURSION MONITORING)

CROSS-REFERENCE TO RELATED APPLICATION

This application is a continuation of copending International Application No. PCT/EP99/02887 filed Apr. 28, 1999, which designated the United States.

BACKGROUND OF THE INVENTION

Field of the Invention

The invention relates to a method and a device for monitoring or limiting a power rise during startup of a nuclear reactor, in which a local power is detected in so-called "power region channels" in individual regions of the core, such as is described, for example, in International Publication No. WO 96/21929, corresponding to U.S. Pat. Nos. 5,875,221 and 5,978,429, and European Patent Application 0 496 551 A1, in normal operation through the use of measuring signals.

During startup of a nuclear reactor, the neutron flux level, which is proportional to the power of the reactor generated by nuclear fissions, is raised from a neutron flux source level at approximately $10^{-9}$ of a rated power initially up to reaching a heating-up power which is, for example, approximately $10^{-3}$ of the rated power. In that intermediate range of the reactor power, the rise in the neutron flux density virtually does not change the thermal conditions in the reactor core, that is to say, in particular, the temperatures of the nuclear fuel. As a result almost no reactivity feedback effects are produced which could influence the rate of rise of the neutron flux density. It is only above that intermediate range, that is to say in the percentage range of reactor power (lowermost power range) that, because of the then sensible heating of the nuclear fuel and because of the energy contribution to the coolant, which results therefrom (and is delayed by the fuel time constant), that a reactivity feedback corresponding to the reactivity coefficients of the reactor core begins. That reactivity feedback generally effects a continuous retardation of the power rise until it comes completely to a standstill.

The rise in the neutron flux density through the many decades of the intermediate range is effected by setting a slightly supercritical nuclear state. An effective multiplication factor of the core configuration $k_{\it eff}$ is therefore raised slightly above 1. That purpose is served by suitable reactivity control elements which, in the case of the boiling water reactor type preferably considered herein, are generally control rods, having an absorption effect for neutrons which is specifically reduced by metered withdrawal from the core. The neutron flux density rises in accordance with an exponential function after a supercritical nuclear state is reached. The rate of rise can be characterized by specifying a so-called reactor period. The reactor period is that period of time in which the neutron flux density in the core changes by a factor e=2.718 . . .

The neutrons released by a nuclear fission are partly "prompt" neutrons, which are released immediately by the split nucleus, and partly "delayed neutrons", which originate from unstable follower nuclei.

In the case of a normal startup operation, the excess reactivity of the core (that is to say the part of the effective multiplication factor $k_{\it eff}$ exceeding the value 1) is set in such a way that the delayed neutrons retain the determining influence on the rate of rise of the neutron flux density. In order to ensure effective controllability, it is customary to undertake the startup in such a way that the reactor period is more than 30 seconds.

However, because of operating errors or accidents, the excess reactivity during startup of the nuclear reactor can also become so large that the rate of rise of the neutron flux density is exclusively determined by the prompt neutrons with their very fast neutron cycle, and the delayed neutrons lose any influence on the rate of rise. That reactor state is denoted as "prompt critical". The associated reactor period is far below 1 second. The startup operation then changes into an "excursion", in the case of which the rated value of the reactor power is exceeded briefly, depending on the excess reactivity, before the power is caught by inherent reactivity feedback. Other than in the case of the below-prompt critical startup operations, in the case of excursions the power rise is not already caught in the lowermost power range.

In the case of the occurrence of an excursion, the task is set for the nuclear instrumentation of the nuclear reactor of automatically actuating an emergency reactor shutdown reliably and in good time in such a way that at least conceivable consequent excursions are suppressed.

A boiling water reactor, a conventional instrumentation system for monitoring and controlling in accordance with the prior art and a typical measuring range are considered below and explained in detail with the aid of FIGS. 1 and 2 as a preferred example.

In order to also take account of the most dangerous extreme case ("conservative" view), it may be assumed that in terms of order of magnitude the neutron flux level has already risen in that time in the range of the rated power ("primary" excursion). The fuel heating connected therewith has then effected an inherent decrease in the excess reactivity through the promptly acting fuel temperature reactivity coefficient. As a result the reactor power already drops again when the control rods actually begin to be inserted into the core. Thus, viewed conservatively, the emergency reactor shutdown can neither prevent the occurrence of the primary excursion nor decisively dampen its course. However, its aim is to suppress conceivable consequent excursions which could come about due to further extraction of the control rods causing the accident, and through dissipation of the thermal energy determining the reactivity negative feedback.

SUMMARY OF THE INVENTION

It is accordingly an object of the invention to provide a different method and device for monitoring the power rise during startup of a nuclear reactor provided with power range channels (diversitary excursion monitoring), which overcome the hereinafore-mentioned disadvantages of the heretofore-known methods and devices of this general type, which monitor consequent excursions in order to further increase reliability with which a suitable countermeasure is initiated and which create an additional initiation of the countermeasure through a monitoring system that is diversitary, that is to say it operates according to a different method and is completely independent of an intermediate range UD system.

Evidently, a power range LD system, which likewise has a redundant layout, does not come into consideration in principle as such a monitoring device which is independent of the UD system and preferably diversitary. That is because the overload limit mark of the LD system has not so far fulfilled the requirements to be placed on the monitoring of reactivity excursions. Specifically, because of the very steep distributions of the neutron flux density in the core, which is typical of such accidents, the LD system detectors situated in the vicinity of the excursion center, which supply the main signal contribution for the LD channels, become saturated and cannot feed the full level of the signal substantially exceeding their measuring range into the LD channel. The otherwise very good track fidelity of LD channels is thus naturally no longer obtained in the case of saturation of assigned LVD signals, and the LD signal does not reach the overload limit mark, although the reactor power is actually much higher. Moreover, the overload limit mark is likewise unable to counteract weaker excursions, which cannot even reach that power.

The invention assumes, however, that the LD system can be used when use is made of a limit value which can be reliably monitored even in the case of an excursion. Thus, use is made for the LD system of the nuclear reactor of a limit value criterion which responds reliably even in the case of an excursion and is diversitary in relation to the RESA triggering derived from the UD system or WD system. The limit at which a countermeasure must be initiated is set within the measuring range of the LD channels at a power which is so low that saturation of the detectors of the LD system either does not yet generally occur there, or in any case can only have a negligible influence. Therefore, according to the invention, that limit value is disposed generally far below the nominal value of the reactor power, and therefore responds even to weaker excursions. In order to detect the excursion, the power band situated below that limit value is used as a filter which responds only to the rate of rise and therefore permits a proper, slow traversal of the power band without activating the countermeasure.

With the foregoing and other objects in view there is provided, in accordance with the invention, a method for monitoring a power rise during startup of a nuclear reactor, which comprises detecting power of a nuclear reactor in power range channels with measuring signals during normal operation; and monitoring at least the measuring signal of one power range channel to initiate a countermeasure when a power band in a lower part of a measuring range of the power range channel is traversed more quickly than a prescribed minimum time.

With the objects of the invention in view, there is also provided a method for longer term limitation of a power rise during startup of a nuclear reactor, which comprises detecting power of a nuclear reactor in power range channels with measuring signals during normal operation; monitoring at least the measuring signal of one power range channel for the reactor power; and continuing startup of the nuclear reactor only when the measuring signal for the reactor power does not exceed an upper limit of a power band after last exceeding a lower limit mark of the power band in a lower part of a measuring range of the power range channel for a duration of a prescribed minimum time.

The invention therefore provides, in the case of a nuclear reactor having a power which is detected in normal operation through the use of measuring signals from power range detectors in power range channels, for the power rise to be monitored, even in the case of startup, by already using at least the measuring signal of one power range channel. In this case, the fact that this countermeasure is not held to be necessary until a power band in the lower part of the measuring range of this power range channel is traversed more quickly than in a prescribed minimum time, is used as an actuating criterion for an emergency reactor shutdown (RESA) or a similar countermeasure.

As has already been explained, a primary excursion proceeds so quickly that it cannot be prevented. This is not necessary if the primary excursion is restabilized immediately without initiating consequent excursions which could lead to a longer term power rise. The invention therefore likewise provides for monitoring the measuring signal of a power range channel in order to prevent such consequent excursions, and thus for the purpose of longer term limitation of the power rise during startup of such a nuclear reactor. The startup of the nuclear reactor is continued only if this measuring signal for the reactor power after the last overshooting of a lower limit mark of a power band situated in the lower part of the measuring range of this power range channel does not exceed the upper limit of the power band during the duration of a prescribed minimum time.

In accordance with another mode of the invention, there is provided a method which further comprises forming the measuring signal of each power range channel for the reactor power by summing measuring signals of power distribution detectors distributed over a volume of a reactor core.

In accordance with a further mode of the invention, there is provided a method which further comprises fixing at least one of an operationally independent lower and upper limit mark for the power band.

In accordance with an added mode of the invention, there is provided a method which further comprises placing the power band in a lower third, preferably a lower quarter, of a rated power of the reactor.

In accordance with an additional mode of the invention, there is provided a method which further comprises prescribing at least one of a width of the power band and a minimum time in an operationally independent manner.

In accordance with yet another mode of the invention, there is provided a method which further comprises setting a width of the power band at less than $\frac{1}{3}$, preferably less than $\frac{1}{5}$, of a rated power.

In accordance with yet a further mode of the invention, there is provided a method which further comprises setting the minimum time at less than one minute.

In accordance with yet an added mode of the invention, there is provided a method which further comprises continuously detecting the reactor power with measuring signals of a plurality of power range channels, and redundantly monitoring the reactor power.

In accordance with yet an additional mode of the invention, there is provided a method which further comprises monitoring signals of additional neutron flux detectors during startup of the reactor having a reactor core from which control rods are being withdrawn. In accordance with again another mode of the invention, there is provided a method which further comprises monitoring the power of the reactor core for maintenance of current maximum values with the aid of the additional neutron flux detectors, and varying the current maximum value as a function of operation during startup.

With the objects of the invention in view, there is also provided a device for monitoring the startup operation of such a core, which includes a logic circuit connected to at least one power range channel that is activated for a prescribed minimum time when a lower limit mark for a power band situated in the lower part of the measuring range of the power range channel is exceeded. This logic circuit then sets a signal for initiating countermeasures whenever the measuring signal of the power range channel for the reactor power exceeds an upper limit of the power band.

In accordance with another feature of the invention, there is provided an evaluation circuit, the logic circuit being one of a plurality of redundantly operating logic circuits connected to the evaluation circuit and to the power range channels.

In accordance with a further feature of the invention, there is provided an actuator for inserting control rods into a reactor core and for shutting down the reactor, the actuator to be excited by the signal for initiating countermeasures.

In accordance with a concomitant feature of the invention, there are provided additional neutron flux detectors, and a monitoring device connected to the additional neutron flux detectors, the actuator to be additionally activated by the monitoring device.

The use of time windows in the monitoring of the reactor power and of the measuring signals of power range detectors has certainly already been proposed in connection with oscillations which can be caused by hydrodynamic instabilities and likewise constitute a malfunction. However, such time windows serve the purpose of activating further time windows during monitoring of the same measuring signal, or are activated by a different activation signal derived from the measuring signal. The present invention has nothing to do with such oscillations. Instead, the present method and the present device are preferably already active without such a preceding activation signal derived from the measuring signal, and are also not used to activate further instances of monitoring or time steps used for monitoring the measuring signal.

Other features which are considered as characteristic for the invention are set forth in the appended claims.

Although the invention is illustrated and described herein as embodied in a method and a device for monitoring the power rise during startup of a nuclear reactor (diversitary excursion monitoring), it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now to the figures of the drawings in detail and first, particularly, to FIGS. 1 and 2 thereof, there is seen a boiling water reactor and a conventional instrumentation system for monitoring and controlling in accordance with the prior art, which are considered below as a preferred example.

Figure 1:
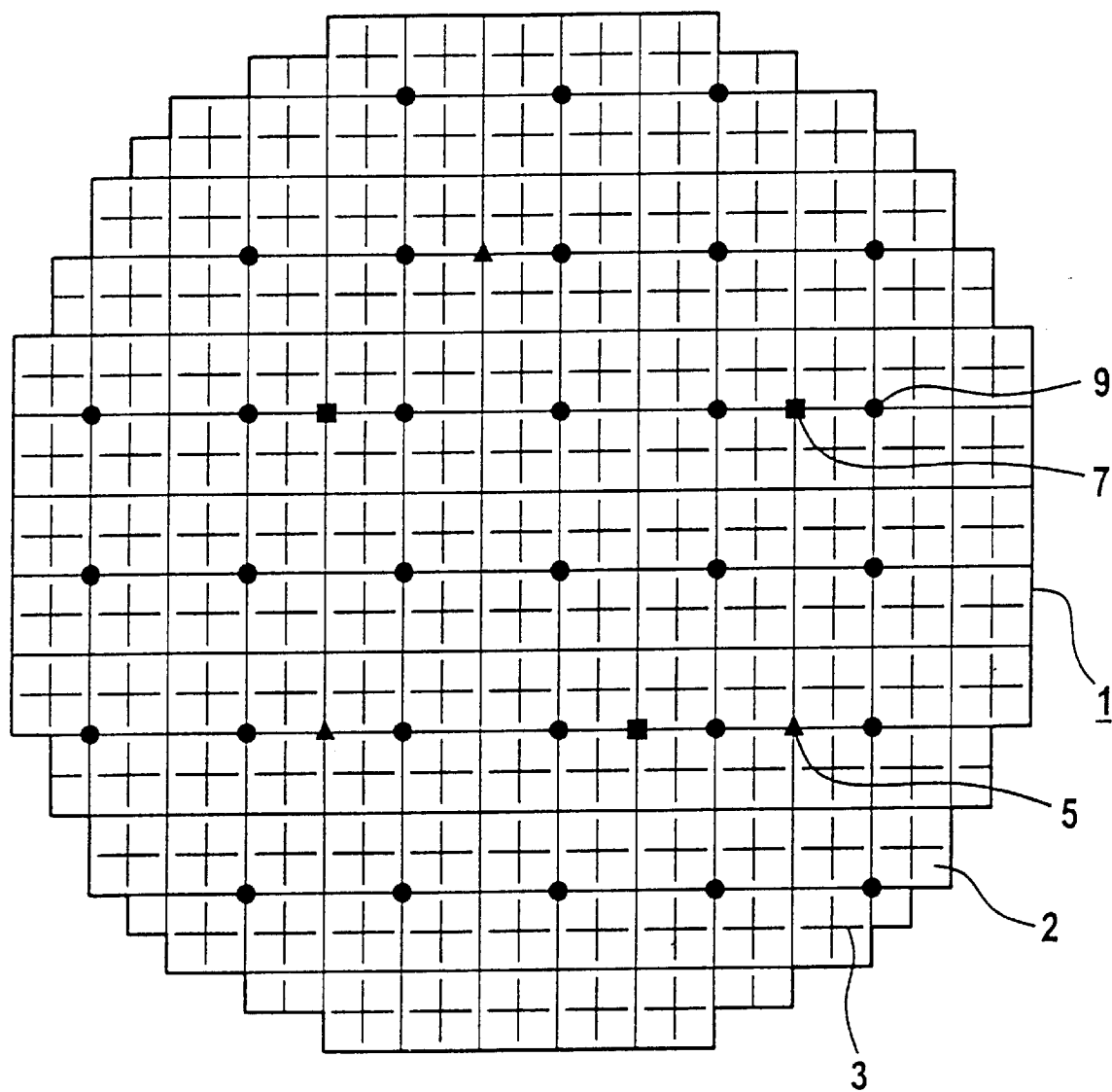
FIG. 1 is a diagrammatic, plan view of a reactor core with positions for instrument lances having detectors for a counter tube range or startup range, an intermediate range and a power range.

FIG. 1 shows a typical configuration of detectors of various nuclear instrumentation systems. Fuel elements distributed over a cross section of a reactor core 1 are combined in each case to form cells 2 of four fuel elements, which are disposed around a common, cruciform control rod 3. The instrumentation includes three systems, specifically for a counter tube range or startup range AD (for a neutron flux P which reaches approximately up to $10^{-5}$ of a normal flux for which the reactor is constructed), an intermediate range UD (where the neutron flux P is approximately $10^{-6}$ to $10^{-1}$) and a power range LD (where the neutron flux P is approximately from $10^{-2}$), to which a measuring sensitivity of the assigned detectors and evaluation devices are tuned. Usually, a plurality of detectors are respectively disposed in instrument lances in the interior of the reactor core between the fuel elements. The evaluation devices of the systems are respectively combined to form redundantly operating channels in such a way that in the event of failure of a detector or the evaluation device thereof, or of the power supply, at most one channel fails. In that case, the assignment of the detectors and instrument lances to the channels can be linear (for example, FIG. 1 respectively provides three instrument lances 5 and 7 for the system of the counter tube range or startup range AD and the intermediate range UD, having detectors and evaluation units which respectively form a channel). However, it would also be possible to provide a plurality of detectors in each instrument lance and to network the evaluation devices in such a way that each channel is assigned detectors, evaluation devices and power supplies of different instrument lances.

That networking is provided for the system of the power range LD. In order to form three monitoring channels, instrument lances 9, which are distributed over the entire cross section of the core, each carry at least three power distributor detectors that are disposed at a different level in each case, and provide measuring signals which can be used for the purpose of measuring the local power in the reactor, and of redundantly determining a three-dimensional power distribution through the use of three independent power distribution channels. In order to obtain an actual value (measuring signal) of a total power for the control or regulation of the reactor, the LD system includes three power range channels in which measuring signals of the power distribution detectors 9 are summed. It is possible in this case to exclude defective detectors or evaluation devices from the formation of the power distribution signals and/or a power range signal, and to compensate a distortion of the signals thereby produced by connecting or disconnecting further detector signals in the corresponding channel.

Thus, in FIG. 1 each system is equipped for redundancy reasons with a plurality of mutually independent measuring channels which are similar to one another. In the case of the example shown in FIG. 1, there are three measuring channels per system.

Figure 2:
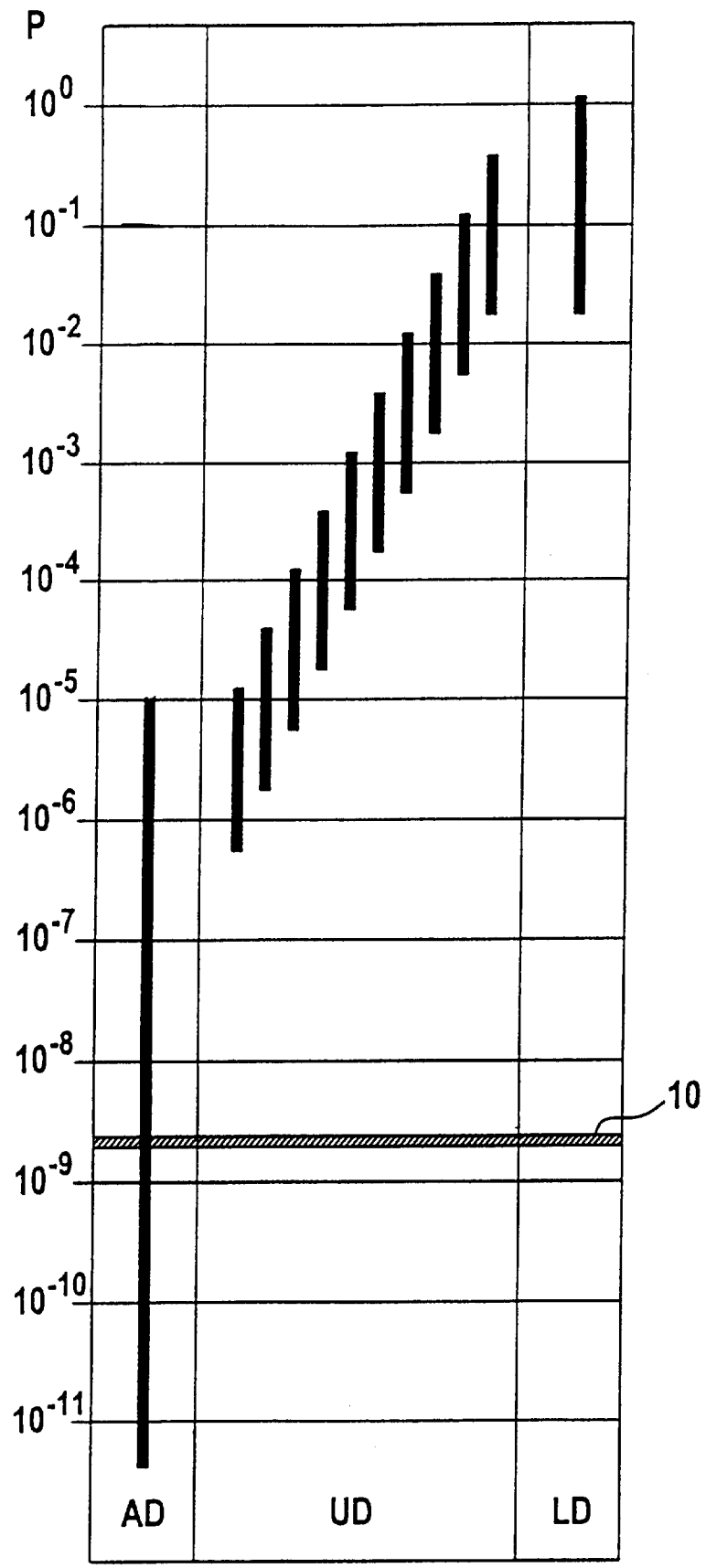
FIG. 2 is a table showing measuring ranges for counter tube range detectors, intermediate range detectors and power range detectors.

FIG. 2 illustrates a typical measuring range for each of those systems of the nuclear instrumentation. The counter tube range or startup range detectors (AD) measure the neutron flux P from the neutron source level (neutron flux of the completely shut down reactor core) up to a reactor power on the order of magnitude of $10^{-5}$ of the rated power. In the case of irradiated cores, the source level 10 is typically at around $10^{-9}$ of the rated power. However, in special cases, when many or all fuel elements of the core are fresh or only slightly irradiated, it can also be substantially lower.

In the case of startup of a shutdown (subcritical) reactor core, because of repeated partial withdrawal of control rods, the source level continuously rises slightly until finally, a critical state (a self-maintaining chain reaction) is reached within the measuring range of the counter tube range detectors AD. Subsequently, the desired rate of rise of the neutron flux density (positive reactor period) is set by further withdrawal of control rods, in such a way that the measuring signals of the counter tube range detectors AD then indicate an exponential rise in the neutron flux density. The reactor operator can track the signal development over many decades and use it as a basis for his or her control tasks on the basis of a logarithmic signal display selected for the counter tube range detectors AD.

If, while rising, the neutron flux density exceeds the magnitude of approximately $10^{-6}$ of the rated power, the measuring range of the intermediate range detectors (UD) is reached and, in addition to the AD measuring channels, the measuring channels of those detectors indicate the respective magnitude and tendency of the neutron flux density. The UD measuring range also extends over many decades up to the power range. In order to raise the measuring accuracy, that large range is subdivided into a sequence of subranges which follow one another in the manner shown in FIG. 2 with pronounced mutual overlapping of measuring range, and are constructed, for example, with a sensitivity grading of $10^{1/2}$:1 between successive subranges in each case.

The switching over of the subranges is separately performed manually by the staff in the event of rising neutron flux density for each UD measuring channel when the signal approaches the upper measuring range limit of the subrange that is currently set.

A trigger mark is set up for each subrange of a UD channel near the upper measuring range limit. If that mark is exceeded by the measuring signal, an alarm signal of the reactor protection system is automatically activated by the relevant UD channel as long as the overshooting lasts. If further such alarm systems are added from other UD channels, an emergency reactor shutdown (RESA) is initiated in accordance with an evaluation circuit provided for that purpose in the reactor protection system. In other words, all control rods which are partially or completely withdrawn are quickly inserted into the reactor core. In the process, the core changes over into the subcritical state, and the neutron flux density drops back to the source level.

In the case of the example illustrated in FIG. 1, with three redundancies, the initiation of the RESA is generally undertaken whenever the trigger mark is exceeded in any two of the total of three UD channels ("2 from 3" evaluation circuit).

If, in the case of the planned startup operation being considered, the reactor power approaches the upper measuring range limits of the AD channels of around $10^{-5}$ of the rated power, the AD detectors are withdrawn downwards from the core for the purpose of extending the measuring range, and positioned below the reactor core in reflector positions with a neutron flux density which is reduced in comparison with the core interior. It may be seen from FIG. 2 that, because of the mutual overlapping of the AD and UD measuring ranges by more than a decade, the withdrawal of the AD detectors must not be instituted until the UD system has reliably taken over the monitoring of the neutron flux density. A suitable interlock device ensures that the AD detectors can in no way be withdrawn earlier from the core.

It may be noted that in recent structures the functions of an AD channel and a UD channel are also combined in a so-called "wide-range channel" and can be fed by a single wide-range detector (WD). The measuring range of such a WD channel then includes the entire range, which is still divided into the ranges AD and UD in FIG. 2.

If the reactor power exceeds the magnitude of approximately $10^{-2}$ of the rated power, it is detected in addition by the power range channels LD seen in FIG. 2 and indicated for each channel on a linear scale having a measuring range which extends typically from 0% to 125% of the rated power. It is usual for there to be at least three LD channels present which are mutually independent and similar to one another. Each LD channel uses a multiplicity of the neutron-sensitive instrument lances (power distribution detectors "LVD" 9) as detectors. They are distributed virtually uniformly over the core volume and have signal contributions in the LD channel, which are calibrated in accordance with the local power density and are summed. The channels are calibrated to the reactor power at a suitable output load point with the aid of a thermal balance. The result thereof is that the accuracy of indication, the so-called "track fidelity", of the LD channels for the reactor power is very high even in the case of arbitrary changes in power level and power distribution in the reactor core.

The UD measuring channels, which are not able to measure the reactor power with a comparable, high track fidelity as in the LD channels, because of the use of individual detectors disposed locally in the core, are no longer required after and as long as the reactor power exceeds a minimum value which ensures the proper detection of the reactor power by the LD system. This minimum value is frequently fixed at 5% of the rated power. If it is exceeded, the UD channels can be taken out of engagement, for example by withdrawing their detectors from the reactor core and/or by bridging their starting functions.

A series of trigger marks is included in the LD system. Of those trigger marks, the undelayed RESA triggering upon the attainment of a fixed overload limit mark typically disposed at approximately 120% of the neutron flux rated value is of importance with regard to countermeasures in the event of excursions. As in the case of the UD system, the triggering of that limit value by the various mutually redundant LD channels leads to the initiation of the countermeasures in accordance with the prescribed evaluation circuit. In the case of a 3-channel LD system, for example, that is usually likewise a "2 from 3" evaluation circuit (or the one already mentioned).

The following sequence of an excursion results with the nuclear instrumentation of the nuclear reactor according to the prior art, that was described above by way of example. After attainment of the prompt critical reactor state in the counter tube range or in the intermediate range, for example due to defective withdrawal of control rods, the neutron flux density in the core increases so quickly that the changing over of the UD subranges can no longer keep up therewith (to the extent that the staff attempts that at all in such a case). In rapid sequence, the UD channels will exceed the RESA limit value of their respectively set subrange, and actuate the emergency reactor shutdown in accordance with the prescribed evaluation circuit. Due to the unavoidable delays in the signal processing and in electrical, mechanical and hydraulic components of the emergency shutdown system, the control rods are only inserted into the reactor core after a short delay. The detection of the rapid power rise by the UD channels is performed redundantly, with the result that the failure of a channel does not prevent the initiation of the countermeasures.

An emergency reactor shutdown (RESA), or any sort of intervention in the planned startup operation which can be controlled, for example, through the use of a startup program, is intended to be performed in the startup phase (that is to say before the reactor power enters the typical measuring range of the LD detectors, in accordance with the provided startup operation) only if, because of a fault, for example an excursion, the reactor power reaches a limit value Mg which is situated in the measuring range of the detectors of the LD system (for example, 30% of the rated power P). This can be detected, according to FIG. 3, by feeding a reactor power S(t), for example the signal in at least one of the LD channels, to a limit value monitor Gg which activates a corresponding signal A to initiate the countermeasure, upon overshooting of the set limit value Mg. However, an improper overshooting of the limit value Mg during startup must be distinguished from proper operating states in the case of which the startup proceeds according to plan, or normal operation is already present. Consequently, according to FIG. 3, an AND gate AND1 is provided which acts as a filter that prevents such countermeasures in the case of proper operating states. A power band having a lower limit which is defined by a limit mark Mu is consequently placed below the trigger limit (limit value Mg). An output signal Sg in this case leads to the trigger signal A for the countermeasure only when the power band situated therebelow is traversed more quickly than in a prescribed minimum time $\Delta t_B$ (filter action of the power band).

Figure 3:
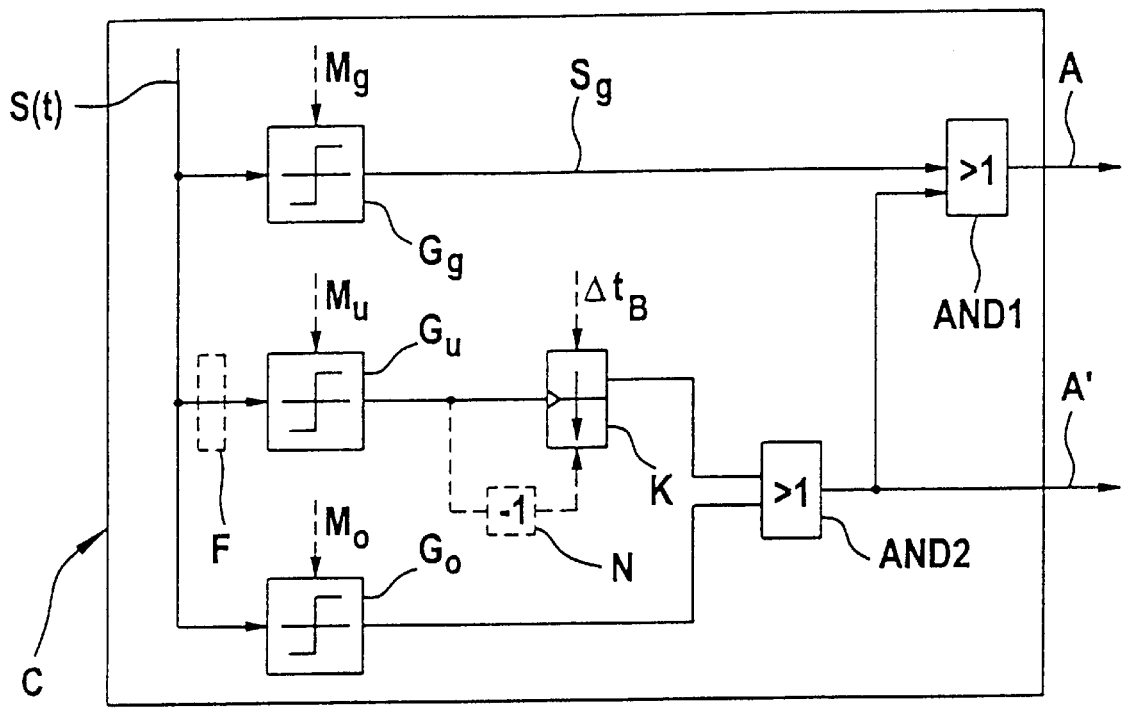
FIG. 3 is a block diagram of a hardware circuit used for the purpose of explaining a filter function of a power band according to the invention.

Although these operations are implemented as a rule as software for the monitoring, regulation and control present in the reactor, this filter action of the power band is represented in FIG. 3. In this case, upon overshooting of the lower limit mark Mu, which is set in a first limit value monitor Gu, the latter outputs a signal that triggers a flip flop K having a time constant that is equal to the minimum time $\Delta t_B$ and sending a corresponding pulse to an input of an AND gate AND2 in this time. Another input of this gate is connected to a second limit value monitor Go, which outputs a signal when the measuring signal S(t) for the reactor power exceeds a set upper limiting mark Mo.

Thus, if the signal S(t) does not exceed the upper limit mark Mo until after the duration $\Delta t_B$ ("standby period") has elapsed, the flip flop K (timing element) is already once again in idle state and both gates AND1 and AND2 block, with the result that activation of the trigger signal A by the signal Sg is prevented. If, however, because of an excursion, the power band is traversed quickly, that is to say the upper limit mark Mo is already exceeded inside the standby period $\Delta t_B$, the signal Sg intervenes on the trigger signal A.

The circuit layout having two AND gates and separate values for Mg and Mo permits the trigger signal A to be used, for example, to initiate a RESA triggering. However, a different triggering A' of an output signal of the gate AND2 permits a less dramatic countermeasure to be instituted. Specifically, if only the signal A' responds, but not the signal A, there can be faults which restabilize themselves even without a reactor shutdown, to the extent, for example, that the programmed startup operation is only slowed down or stopped.

However, a simplification is achieved when the same upper limit mark is used for Mo and Mg. It is then possible in the case of a hardware circuit to dispense with the limit value monitor Gg and the gate AND1. In other words, no distinction is then made between strong excursions in the case of which both the power band (Mo–Mu) is traversed more quickly than the time $\Delta tB$ and the trigger limit Mg is exceeded, and weak excursions in which only the rise criterion is fulfilled but the trigger limit is not reached.

The limit marks can be prescribed as a function of the respective control program (that is to say, for example, the selected control rods) or the power signal S(t) or can be prescribed in some other way as a function of operation. In the limit value monitors Gu and Go, the respective limit value Mu and/or Mo for limiting the power band is advantageously independent of operation. In this case, the power band is advantageously situated in the lower third, preferably in the lower quarter, of the rated power of the reactor. The width, that is to say the difference Mo–Mu, and/or the minimum time $\Delta t_B$ is preferably prescribed in an operationally independent manner. It generally amounts to less than one third, preferably less than one fifth, of the rated power.

The above-described diversitary excursion monitoring is preferably constructed separately for each LD channel. In accordance with an electronic evaluation provided for this purpose, the excitations possibly arriving from the various LD channels, which are mutually redundant, lead to initiation of the excursion countermeasure. The emergency reactor shutdown preferably comes into consideration as such a countermeasure.

The following points of view are important in establishing the position and width of the power band and of the standby period $\Delta t_B$, for the purpose of uniquely distinguishing between excursions and startup operations which are according to plan and possibly accelerated. The power band is expediently to be fixed in such a way that power rises of planned startup operations in any case have either already stabilized themselves below the band due to the reactivity feedback effects which are relevant in this case, or stabilize themselves at the latest within the power band, while it is traversed largely undamped in the case of all excursions. This condition is best fulfilled by the lowermost part of the measuring range of the LD channels which is useful for setting limit marks. The width of the power band (that is to say the power difference $M_o-M_u$) is to be so large that the power band with the highest load change rate which can be realized in this power range in the case of normal operation is traversed on the order of magnitude of approximately one minute. It is then possible to select the length of the standby time period $\Delta t_B$ which is suitable for unambiguously distinguishing between excursions and planned startup procedures, from a relatively large time range 1 s<$\Delta$t<1 min. Upon the observance thereof in terms of control engineering, it is then unnecessary to place any further high accuracy requirements.

A parameter combination with $M_u$=5% of the rated power $M_o$=20% of the rated power $\Delta t_B$=20 s may be specified as an example which in general fulfills the optimization criteria described above.

It would not be damaging if primary excursions occur which are already restabilized in a few fractions of a second and are therefore virtually not detected, for example, due to unavoidable inertias and dead times of hardware (detectors) and software (electronic evaluation). This is also not necessary, since the countermeasure must be initiated only when a measurable rise in power occurs over relatively long times (for example above one second). This is illustrated symbolically in FIG. 3 by a filter for the signal S(t), for example a smoothing filter F at the input of the limit value monitor Gu.

Figure 4:
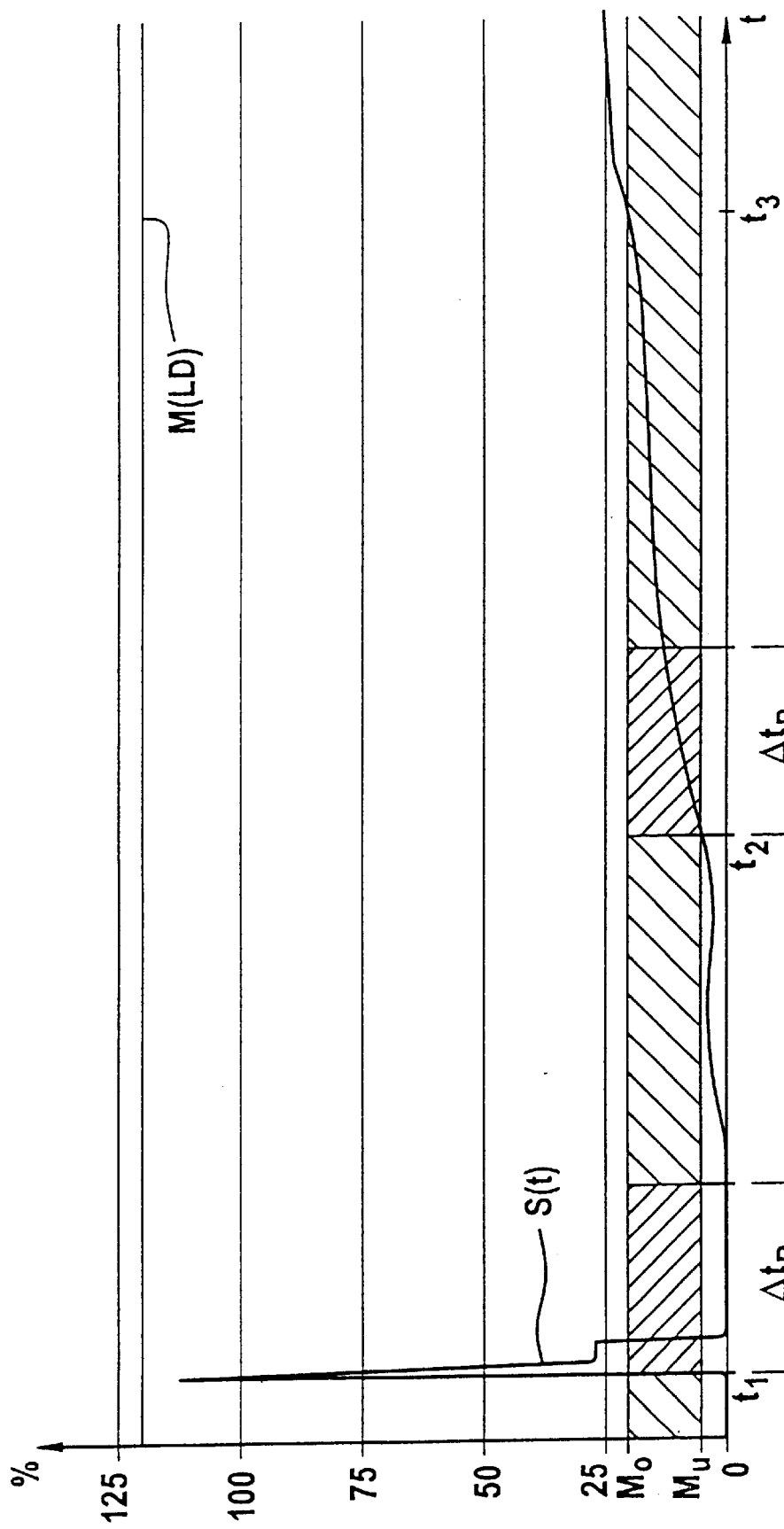
FIG. 4 is a graph showing limit marks and signal characteristics in the case of a primary excursion, consequent excursions and a proper startup.

FIG. 4 initially indicates a limit value M(LD) which is already prescribed in the prior art for the corresponding signal S(t) of the power range channels, in order to undertake a reactor shutdown in normal operation, for example in the case of power fluctuations which are caused by hydraulic instabilities, or in the case of similar malfunctions. A typical limit value M(LD) is, for example, 120% of the rated power P of the reactor.

FIG. 4 also illustrates the power band by showing the upper limit mark Mo and the lower limit mark Mu. It is also assumed that at an instant $t_1$ a primary excursion and any consequent excursions triggered thereby lead to a rise in the power in the reactor indicated by the signal S(t) even before the reactor should actually reach a power of approximately 5% of the rated power, on the basis of the planned startup procedure. The reactor is therefore in a state in which the UD systems according to the prior art take over the monitoring of the reactor. According to the invention, however, the signal S(t) of the LD channels is used for monitoring. For this purpose, upon overshooting of the lower limit mark Mu for the standby time period $\Delta t_B$, a monitoring logic circuit is firstly activated. Upon overshooting of the upper limit mark Mo which simultaneously represents the triggering limit for the countermeasure, this triggers the corresponding monitoring signal with the aid of which the countermeasure is initiated. As a result of this countermeasure (for example a shutdown in the case of which all control rods are once again inserted completely into the core), the reactor power decays again without having reached a dangerous value. The operating staff can then once again cancel the countermeasure and institute a new startup procedure according to a better planned program, or resume the startup procedure interrupted by the countermeasure, in a planned manner.

In this planned startup procedure, the reactor power then grows according to the plan and reaches the values at which the LD systems supply a display of the reactor power which has track fidelity, and the signal S(t) is therefore monitored by the LD systems according to the prior art. In this case, the LD signal S(t) once again overshoots the lower limit mark Mu at an instant $t_2$. However, this limit mark is in a power range (for example $\geq 5\%$) in which a reactor that has been started in a planned manner and appropriately heated up exhibits no more excursions. During the planned power increase, the signal S(t) now traverses the power band at a correspondingly low rate of rise which does not lead to overshooting of the upper limit mark Mo until an instant $t_3$, that is to say long after expiration of the standby time period $\Delta t_B$.

Figure 5A:
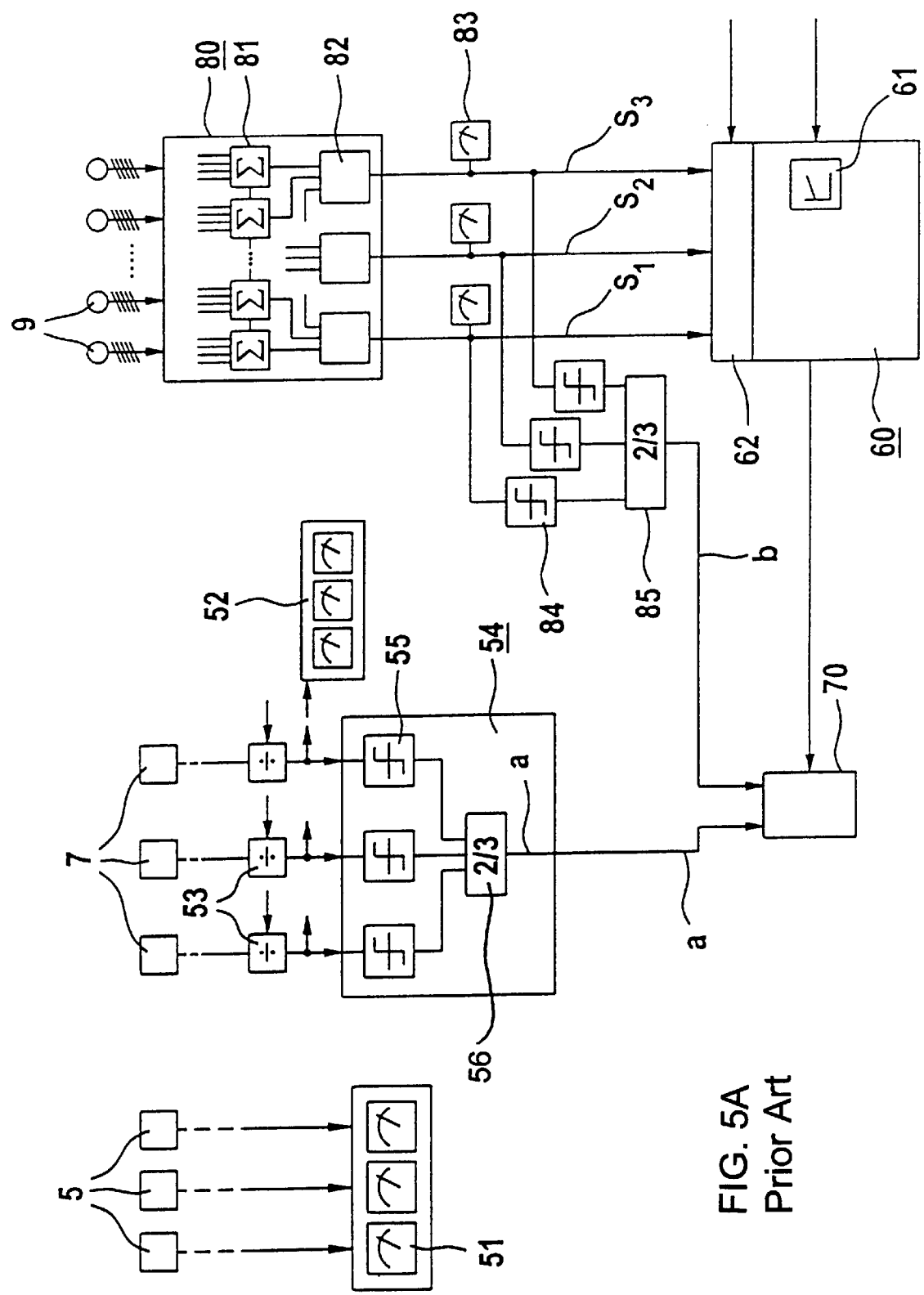
FIG. 5A is a block circuit diagram showing a layout principle of monitoring and control of a core according to the prior art.
Figure 5B:
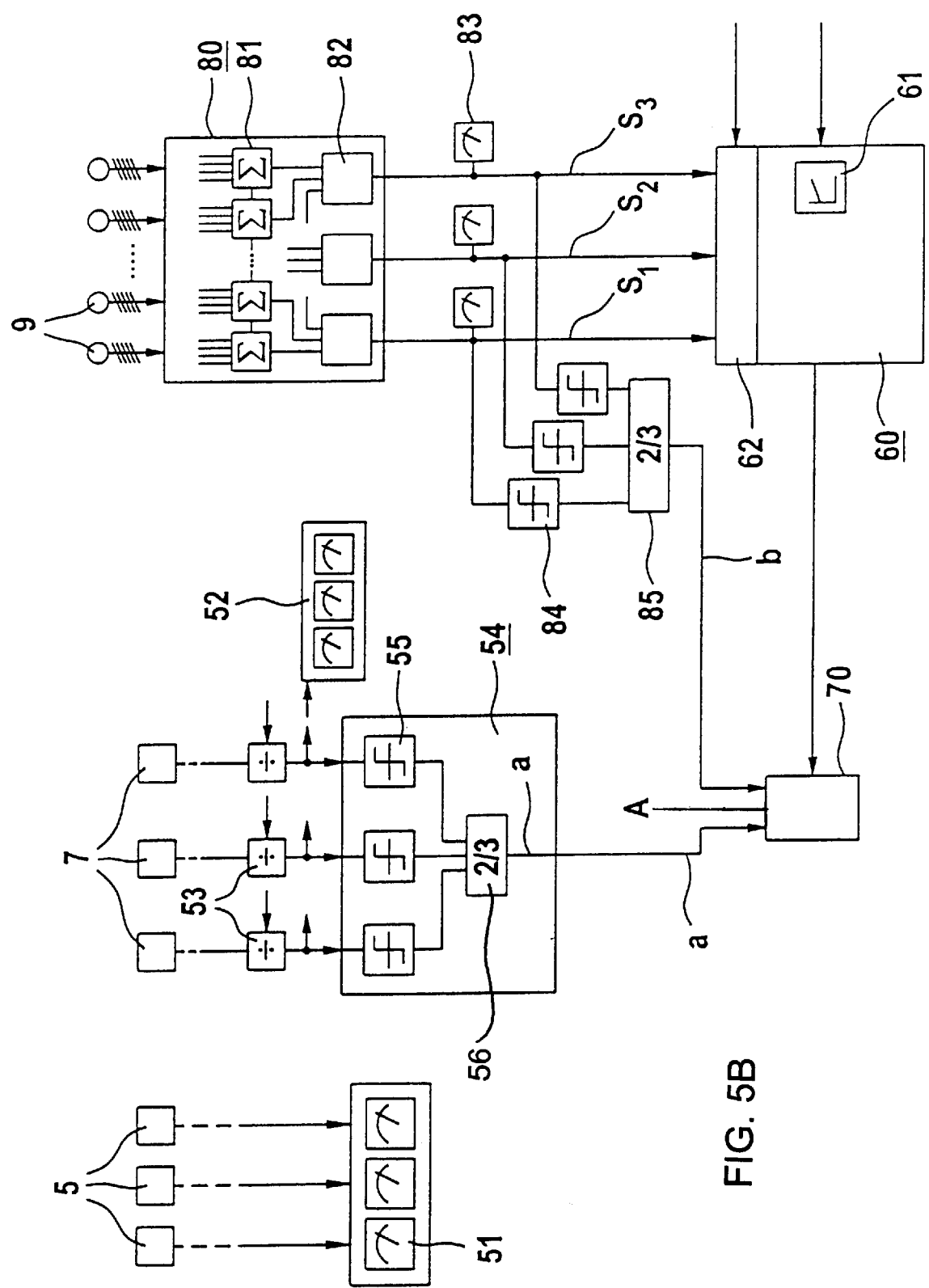
FIG. 5B is a block circuit diagram showing a layout principle of monitoring and control of a core according to the invention of the instant application.

FIG. 5A and FIG. 5B initially illustrates the AD channel detectors and instrument lances 5 provided for the counter tube range or startup range, having signals that can be evaluated, documented and displayed on monitors, for example in a startup electronic monitoring unit 51.

The intermediate range channels UD with lances and detectors 7 can likewise have corresponding monitors 52. These channels furthermore have a device 53 for stepwise reduction of the measuring sensitivity of these channels. This device 53 is indicated in FIG. 5A and FIG. 5B by a symbol of a divider. A corresponding reduction factor for the sensitivity of operating staff is changed, for example, as soon as it can be detected on the monitors 52 that the corresponding signal of the UD channels exceeds the currently set sensitivity range (see FIG. 2). The conventional monitoring of the startup procedure through the use of the UD channels includes a logic circuit monitoring device 54 which outputs a signal in each case upon overshooting of the sensitivity range (which is measurable, for example, in each case by one limit value monitor 55 for each of the three UD channels illustrated). If, in the case of the installed number n of UD channels (in this case: n=3), at least one prescribed number m (in this case: m=2) reports such range overshooting, a corresponding "m from n" circuit (in this case: a "two from three" circuit 56) outputs a signal a with the aid of which an intervention is made into the control of the reactor.

This reactor control is symbolized in FIG. 5A and FIG. 5B as a corresponding control and regulation device 60 having a controller 61 and an actual-value arithmetic circuit 62. For example, a control center can be provided with a display or monitor 83 for the reactor power. A +/− switch is operated by the staff in order to insert the control elements into the core or extract them from it when a lower or higher desired power value is targeted. All desired values and parameters for the planned control of the reactor are set at this device 60. Actuating signals for the corresponding manipulated variables of the reactor operation are largely program-controlled in the device 60 and formed automatically through the use of a plenitude of actual values determined in the reactor and actuator check-back signals which are symbolized in FIG. 5 by actual values $S_1$, $S_2$ and $S_3$ that are formed by sensors and detectors of the LD channels. The actuating signals themselves are relayed to a corresponding actuating device 70 which, in addition to other actuating devices (for example coolant pumps for a coolant loop), chiefly controls drives for inserting and extracting the control rods into and from the reactor.

Therefore, if the monitoring device 54 of the UD channels supplies a corresponding signal a in the prior art, an intervention is made into the reactor operation controlled by the device 60. That is done, for example, by having the controller 61 change to a shutdown program, or by using a computer initially to change directly in the device 70 from the programmed control of the control rods to shutting down the reactor by inserting the control rods.

The LD channels are illustrated in FIG. 5A and FIG. 5B by the corresponding instrument lances and detectors 9. The signals of defective sensors are suppressed in a corresponding electronic evaluation device 80 by using plausibility criteria, in order to network in a corresponding signal interconnection unit 81 only plausible measuring signals from the sensors distributed over the volume of the reactor core, and to respectively form in a subsequent summing circuit 82 an aggregate signal for each LD channel which respectively detects the local distribution of the power in the reactor as a signal $S_1$, $S_2$ and $S_3$ for the power of the reactor.

Each signal $S_1$, $S_2$ and $S_3$ of these redundant power range channels is monitored in a limit value monitor 84 for overshooting of the limit value M(LD). If at least two of the three signals (in general: at least one number m from the number n of the limit monitor signals) exceed this limit value, an appropriate evaluation circuit 85, that is to say a "two from three" circuit (in general: "m from n" circuit) outputs a corresponding signal b. With the aid of the signal b it is possible to activate a shutdown program (or another suitable countermeasure) in the control device 60 or, as illustrated in FIG. 5A and FIG. 5B, to intervene directly in the actuating device 70 for the control elements, in order to interrupt the normal startup procedure and, if appropriate, to initiate an emergency shutdown.

It is not illustrated that signals, combined by the signal interconnection unit 81 in power distribution channels, from detectors of the instrument lances 9 are likewise monitored in three redundant channels for local oscillations. They can likewise trigger the signal b, in order to detect the three-dimensional power distribution.

The power range monitoring by the evaluation device 80 therefore serves the purpose of redundantly monitoring corresponding measuring signals, in accordance with the prior art. The measuring signals are continuously formed by a plurality of power range channels and detect the reactor power. However, such a redundancy with the aid of the signals $S_1$, $S_2$ and $S_3$ is also provided for the monitoring according to the invention in the counter tube range. The actuating device 70 has a corresponding input A with the aid of which it is possible, at least during the startup operation, to apply a trigger signal supplied by an appropriate device to the actuating device 70.

Figure 6:
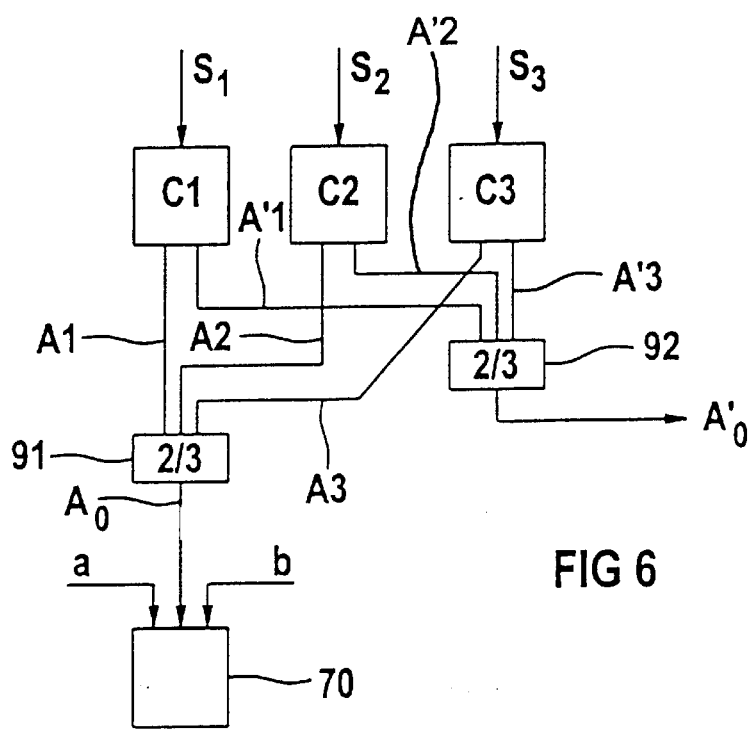
FIG. 6 is a block circuit diagram showing a supplement according to the invention, for FIG. 5B, which is used for the purpose of diversitary excursion monitoring.

Therefore, in accordance with FIG. 6 each of these signals $S_1$, $S_2$ and $S_3$ is assigned a device C1, C2 and C3 corresponding to FIG. 3. Consequently, their signals A1, A2 and A3 and, if appropriate, their signals A'1, A'2 and A'3 as well, are also likewise combined by an "m from n" circuit 91 or 92 to form a corresponding signal $A_0$ or $A'_0$ with the aid of which the trigger signal A can be set. The reactor power is therefore continuously detected through the use of measuring signals of a plurality of power range channels, and redundantly monitored.

The invention can be used to replace the conventional monitoring of the startup through the use of the signal a by monitoring through the use of a signal A, and A1, A2, A3 or $A_0$, respectively, that is to say by a monitoring which uses other sensors and other channels. However, this monitoring of the startup is advantageously used as diversitary monitoring. Thus, in addition to the monitoring through the use of the power range channels and their detectors 9, the signals of the neutron flux detectors 7 are also monitored through the use of the signal a and, if appropriate, used for a countermeasure in order to limit the rise in power. These additionally used neutron flux detectors already monitor the neutron flux of the reactor core according to the prior art in the manner shown in FIG. 2, for observance of a current maximum value which is prescribed as a function of operation, as long as the rods are drawn out of the core and the reactor power is still in the intermediate range. This maximum value is virtually the upper limit of the measuring range respectively prescribed in FIG. 2 for each sensitivity stage.

In accordance with the invention, it is possible to achieve a high reliability in the counter tube range on the basis of a prescribed redundancy. In accordance with FIG. 5B, for example, such a redundancy resides in the fact that a plurality of redundantly operating logic circuits connected to an evaluation circuit process the signals of the power range channels. The further redundancy due to the use as a diversitary system is important for the monitoring device 54. The actuator 70 for the control rods can therefore be activated not only by the signal of a monitoring device according to FIG. 3 or FIG. 6, but additionally also by the monitoring device 54 which is connected to the neutron flux detectors 7 and is constructed by using other physical principles and detectors.

I claim:

1. A method for monitoring a power rise during startup of a nuclear reactor, which comprises:

detecting power of a nuclear reactor in power range channels with measuring signals; and monitoring at least the measuring signal of one power range channel during the startup of the nuclear reactor to initiate a countermeasure, using a logic circuit, when a range between a lower limit and an upper limit of a power band in a lower part of a measuring range of the power range channel is traversed more quickly than a prescribed minimum time due to an excursion.

2. The method according to claim 1, wherein the step of initiating a countermeasure does not include discontinuing the startup of a nuclear reactor when the measuring signal for the reactor power does not exceed an upper limit of a power band for a duration of the prescribed minimum time, said upper limit being higher than said lowers limit.

3. The method according to claim 1, which further comprises forming the measuring signal of each power range channel for the reactor power by summing measuring signals of power distribution detectors distributed over a volume of a reactor core.

4. The method according to claim 2, which further comprises forming the measuring signal of each power range channel for the reactor power by summing measuring signals of power distribution detectors distributed over a volume of a reactor core.

5. The method according to claim 1, which further comprises fixing at least one of an operationally independent lower and upper limit mark for the power band.

6. The method according to claim 2, which further comprises fixing at least one of an operationally independent lower and upper limit mark for the power band.

7. The method according to claim 1, which further comprises placing the power band in a lower third of a rated maximum power of the reactor.

8. The method according to claim 1, which further comprises placing the power band in a lower quarter of a rated maximum power of the reactor.

9. The method according to claim 2, which further comprises placing the power band in a lower third of a rated maximum power of the reactor.

10. The method according to claim 2, which further comprises placing the power band in a lower quarter of a rated maximum power of the reactor.

11. The method according to claim 1 which further comprises prescribing at least one of a width of the power band and a minimum time in an operationally independent manner.

12. The method according to claim 2, which further comprises prescribing at least one of a width of the power band and a minimum time in an operationally independent manner.

13. The method according to claim 1, which further comprises setting a width of the power band at less than $\frac{1}{3}$ of a rated maximum power.

14. The method according to claim 1, which further comprises setting a width of the power band at less than $\frac{1}{5}$ of a rated maximum power.

15. The method according to claim 2, which further comprises setting a width of the power band at less than $\frac{1}{3}$ of a rated maximum power.

16. The method according to claim 2, which further comprises setting a width of the power band at less than $\frac{1}{5}$ of a rated maximum power.

17. The method according to claim 1, which further comprises setting the minimum time at less than one minute.

18. The method according to claim 2, which further comprises setting the minimum time at less than one minute.

19. The method according to claim 1, which further comprises continuously detecting the reactor power with measuring signals of a plurality of power range channels, and redundantly monitoring the reactor power.

20. The method according to claim 2, which further comprises continuously detecting the reactor power with measuring signals of a plurality of power range channels, and redundantly monitoring the reactor power.

21. The method according to claim 1, which further comprises monitoring signals of additional neutron flux detectors during startup of the reactor having a reactor core from which control rods are being withdrawn.

22. The method according to claim 2, which further comprises monitoring signals of additional neutron flux detectors during startup of the reactor having a reactor core from which control rods are being withdrawn.

23. The method according to claim 21, which further comprises monitoring the power of the reactor core for maintenance of current maximum values with the aid of the additional neutron flux detectors, and varying the current maximum value as a function of operation during startup.

24. The method according to claim 22, which further comprises monitoring the power of the reactor core for maintenance of current maximum values with the aid of the additional neutron flux detectors, and varying the current maximum value as a function of operation during startup.

* * * * *